Aug. 5, 1952    C. F. WARREN    2,606,032
CHECK VALVE ASSEMBLY
Original Filed March 13, 1944
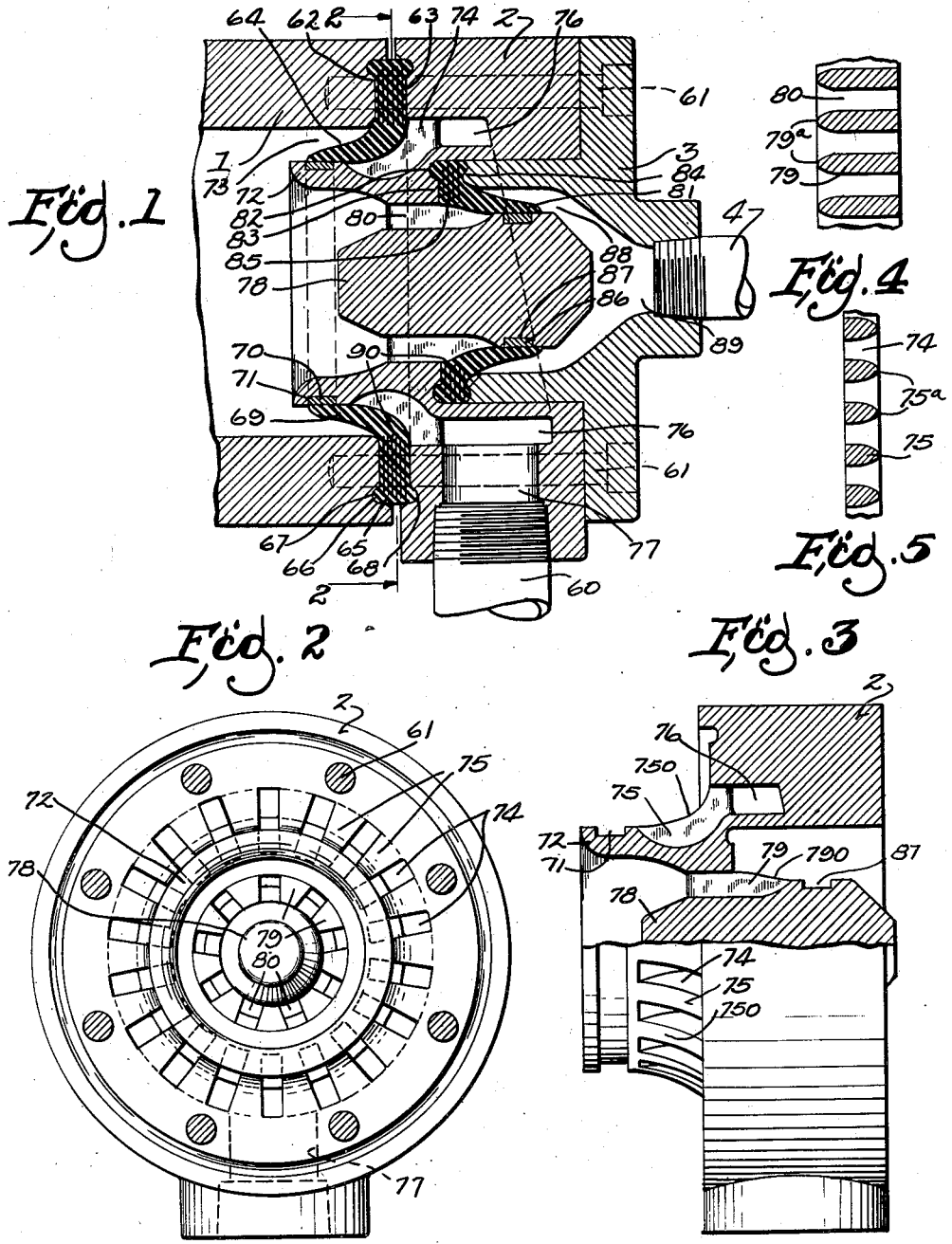
INVENTOR
CHARLES F. WARREN
BY Wheeler, Wheeler & Wheeler
ATTORNEYS Patented Aug. 5, 1952

2,606,032

UNITED STATES PATENT OFFICE 2,606,032

CHECK VALVE ASSEMBLY

Charles F. Warren, Milwaukee, Wis.; Kathleen Warren, executrix of said Charles F. Warren, deceased, assignor to Charles F. Warren, Jr.

Original application March 13, 1944, Serial No. 526,188, now Patent No. 2,424,595, dated July 29, 1947. Divided and this application June 6, 1947, Serial No. 753,073

9 Claims. (Cl. 277—61)

This invention relates to improvements in a check valve assembly. The present application is a division of my application 526,188, entitled Pumping Mechanism, filed March 13, 1944 now Patent No. 2,424,595 dated July 29, 1947.

It is a primary object of the invention to provide a novel, compact and simple check valve organization in which there are no moving metallic parts, the valves constituting flexible members having radially disposed supporting portions and generally cylindrical axially disposed valve portions opening by expansion. In each of the two coaxially arranged valves, it is my purpose to provide webs subdividing the ports and providing full mechanic support for the valve members against collapse of such members under back pressure.

It is a further object of the invention to provide a check valve in which the valve member comprises an annulus of elastically flexible material of tapering thickness with a reenforced marginal periphery radially disposed and clamped in fixed position and a thinner inner periphery constituting the movable valve element.

It is also my purpose to provide a construction in which back pressure not only urges but wedges each valve member toward its respective ancillary seat, from which the valve is readily yieldable with little resistance when flow is in the right direction.

Other objects and advantages of the invention will appear from the following disclosure, reference being made to the drawings in which:

Fig. 1 is a view in axial cross section through a double check valve embodying my invention.

Fig. 2 is a view in transverse section on the line 2—2 of Fig. 1 through the bolts holding the valve casing element together, one of the casing elements being shown in front elevation.

Fig. 3 is a view partially in side elevation and partially in axial section through the casing element shown in Fig. 2.

Fig. 4 is a developed view in cross section through some of the valve inlet ports 35.

Fig. 5 is a view in cross section through some of the valve outlet ports.

By way of exemplification only, the valve mechanisms herein disclosed are illustrated in association with a portion of the pump chamber of the parent application above identified, such pump chamber portion being, in the present device, also a portion of the valve chamber. For pump purposes, and for many other uses, the valves are desirably coaxially arranged and their compact organization in this manner is one of the objectives of the present invention. However, for many other purposes, either valve may be used individually.

The casing member 1, into which liquid is drawn from the inlet pipe 60, and from which it is expelled through the outlet pipe 4, has connected to its outer end the ring 2 and the closure or cap plate 3. Countersunk cap screws 61 extend through the cover plate 3 and through the ring 2 into threaded openings in the end wall of the pump chamber 1 to hold these parts in assembled relation. The ring 2 has an annular end wall from which sleeve 72 projects axially through the ring into casing 1. Within the sleeve is core 78. The annular port between the ring 2 and the sleeve 72 is spanned by partition webs 75, while the similar port between the sleeve and core is spanned by webs 79, whereby the ring and sleeve and core are unitarily connected.

The end wall 62 of the chamber 1 and the opposing end wall 63 of the ring 2 function as clamping jaws to secure an annular valve member of rubber or similar resilient material shown at 64. The thicker mounting portion 65 of this valve member is gripped between the faces 62 and 63, and the extreme marginal portion 66 is made slightly wider than the remainder of the body and is accommodated in annular grooves 67 and 68 formed in these faces 62 and 63 respectively.

The free inner annular portion 69 of the valve member 64 is of tapering cross section and generally cylindrical form and is formed so as to extend substantially at right angles (as viewed in cross section) to the mounting portion 65. The inner margin of the valve member thus encompasses and seats against the annular valve seat 70, which, as seen in Fig. 1, is supported in a groove 71 formed in the sleeve 72. This sleeve extends rearwardly (to the left in Fig. 1) from the transverse end wall of the ring 2, and is spaced within the chamber so as to provide an annular passage 73 across which the valve 64 extends when it contacts with the seat 70. This passage 73 connects with a series of passages 74 between the aforesaid partition webs 75, against the curvilinear margins 750 of which the resilient valve member 64 is supported. The passages 74 lead from an annular manifold 76 which has an inlet 77 leading from the lower side of said manifold and provided with threads for connection of the pipe 60 thereto. As shown (Fig. 1), the manifold 76 is of tapered cross section to ensure distribution of the incoming fluid to the several channels 74. Thus, whenever there is less pressure in casing 1 than in manifold 76, the pressure on the inner face of the valve member 64, which is seated at 70, causes the thin free edge of the valve to be expanded and unseated, and the liquid in the pipe 60 passes the valve into the casing 1.

Within the inner cylindrical portion 72 of the ring 2, the core 78 is supported by integral webs 79 spaced at intervals circumferentially of the core 78 and subdividing the annular port into annular series of passages 80 between the webs. These passages are closed normally by an annular valve member 81 of rubber or like resilient material, having an anchorage portion 82 which is clamped between a shoulder 83 at the outer end of the sleeve 72 and the end of a tube 84 which is integral with the cover plate 3 and which telescopes within the outer end wall of the ring 2. A thickened and generally radial mounting portion 85 of the valve member is accommodated in grooves adjacent these clamping faces, as seen in Fig. 1, to ensure anchorage and retention of the valve in this position, and the inner flexible annular portion of the valve member is tapered to a free edge of minimum thickness and cylindrical internal contour, said edge being disposed at right angles to the anchored body portion 82 (as viewed in cross section) so as to engage an annular seat 86 lodged in a groove 87 in the core member 78. Around this end of the core, and immediately around the thinner portion of the valve member 81, an annular passage 88 is formed between the core 78 and a bore in the cover plate 3, and this passage tapers to a central outlet 89 which is threaded for connection with the outlet pipe 4.

The portions of the valve members 64 and 81 which are compressively gripped between shoulders of the structure for anchoring them in position are preferably reinforced by intermolded rings of fabric, indicated at 90, so as to somewhat limit compressibility of these portions of the valve members and permit them to be firmly clamped in place when the parts 1, 2 and 3 are assembled and secured by the clamping screws 61.

To facilitate the flow of the liquid through the channels 74 and 80, the ends of the intervening ribs 75 and 79 are preferably tapered or streamlined, as indicated in Figs. 4 and 5. Thus, the tapered end portions 79ᵃ confront the flow of liquid as it enters passages 80 between the ribs 79 and the tapered end 75ᵃ of the ribs 75 direct the flow into the intervening passages 74.

The valve 64 unseats readily to permit flow from pipe 60 into chamber 1, but seats positively and with a wedging action in response to pressures in chamber 1 in excess of those in the manifold 76. The wedging action is, of course, attributable to the relatively large area of the flexible valve member 64 which is exposed to pressures within chamber 1, and to the curve with which the valve member is formed between its anchorage portion and its free flexible edge. The concave shoulders 75⁰ of the supporting webs or partitions 75 support the valve naturally in the curve to which it is formed.

The outlet check valve 81 operates similarly in the opposite direction to open with facility for the escape of fluid from chamber 1 to pipe 4, but to close whenever the pressure in chamber 1 is less than that in the manifold 88. The shoulders 79⁰ of webs 97 have a different curvature from that of the shoulder 75⁰ of web 75 but they provide similar support for the outlet valve 81 to enable it to seat securely with a wedging action comparable to that already described.

Due to the fact that the valves are coaxial, the structure is very compact. It is also simple and easily assembled and disassembled, a single set of bolts or cap screws maintaining the entire assembly. The valves are biased to their respective seats by their own elasticity and require no springs. Nor are their any moving metallic parts. Pressure differential is primarily relied upon for the assurance of a perfect seat and, consequently, a very light pressure differential in the appropriate direction will open one valve or the other.

I claim:

1. A valve comprising an outer shell having axially separable parts provided with clamping shoulders, an inner core spaced from the shell to provide an annular port between the core and the shell, said core having a seat at one end of said port and axially offset from the shoulders of said shell, a plurality of integral webs connecting the core with one of the parts of the shell and having curvilinear shoulders extending from the last mentioned shell part substantially fully to the seat of the core, and an annular valve having a relatively heavy mounting portion engaged between the shoulders of the shell parts and extending thence curvilinearly to a generally cylindrical portion engaging the core at the seat, said valve having intermediate portions substantially fully supported upon the shoulders of said webs, together with clamping means connecting said shell parts in clamping engagement with the mounting portion of said valve.

2. A compound check valve structure comprising in combination an outer shell, an intermediate sleeve spaced within the outer shell and provided with a valve seat, a core spaced within the sleeve and provided with a valve seat, partition webs subdividing the annular space between the shell and the sleeve to provide a multiple port, partition webs spanning the space between the sleeve and the core and providing a multiple port, all of said webs being provided with valve supporting shoulders extending to, and running out at, the respective seats, a flexible annular valve member projecting inwardly from said shell in conformity with the shoulders of the partition webs first mentioned and extending axially toward the seat of said shell, said valve having a free margin adjacent said seat, a second valve member projecting inwardly from said sleeve and extending in contact with the partition webs second mentioned axially of said core and provided with a free margin adjacent the seat portion of said core, an end closure means providing a manifold communicating with the port controlled by the first valve, and a discharge pipe communicating with the space within said sleeve whereby to receive effluent controlled by the second valve.

3. In a device of the character described, the combination of a casing member having a terminal shoulder, a ring member having a terminal shoulder complementary to that of the casing member, a core disposed axially within the ring member, a sleeve intermediate the ring member and the core and providing concentric ports outside and inside of the sleeve, integral partition webs connecting the sleeve with the ring member and the core respectively and each provided with a valve supporting edge, said sleeve projecting into the casing member and being provided within the ring member with a second valve clamping shoulder, a cap for the ring member having a valve clamping shoulder complementary to that of the sleeve and provided with a fluid connection to the space between the sleeve and the core, said ring member having a manifold communicating with the space between the ring member and the sleeve and having a fluid connection to said manifold, a first valve member clamped between the shoulders of the casing member and the ring and extending thence inwardly upon the edges of said webs and axially to the seat of the sleeve, a second valve member clamped between the shoulders of the sleeve and the cap and extending inwardly and supported on the edges of the webs between the sleeve and the core and extending thence axially to the seat portion of the core, and bolts holding the cap, the ring member and the casing member together, the respective valve members extending oppositely from their clamped portions to their respective free edges and each having an outer surface exposed to back pressure and each being supported inwardly by the edges of the partition webs respectively.

4. As a new article of manufacture, an annulus comprising an outer ring, an inner core, an intermediate sleeve and partition webs spacing the sleeve from the ring and the core, the sleeve and the core having axially elongated valve seats axially offset in opposite directions from opposite ends of said webs and toward which marginal surfaces of the respective webs lead in opposite directions.

5. The sub-combination recited in claim 4 in which said annulus comprises integral means closing the space between the ring and the sleeve and providing a manifold, said ring having a lateral connection communicating with said manifold.

6. The sub-combination recited in claim 4 in which said annulus comprises integral means closing the space between the ring and the sleeve and providing a manifold, said ring having a lateral connection communicating with said manifold, said manifold being of progressively decreasing cross section away from the aforesaid connection, and the partition webs between the ring and the sleeve terminating short of said manifold and providing intermediate port spaces opening from the manifold.

7. The sub-combination recited in claim 4 in which the several partition webs are frusto-conically formed on the edges leading to respective seats and have their respective opposite edges streamlined and tapered in thickness.

8. In a valve, the combination of a casing member provided with a terminal shoulder, of a ring member having a complementary shoulder and a closure portion, a sleeve extending axially from the closure portion of the ring member to a point within the casing member and there provided with a valve seat, partition webs connecting intermediate portions of the sleeve with the ring member adjacent its shoulder, said sleeve being spaced within the ring member and casing member to provide an annular port subdivided by said partition means curving concavely toward the seat portion of said sleeve, and an annular valve having a relatively heavy anchorage portion clamped between the shoulders of the casing member and the ring member respectively, said valve extending inwardly from the casing member and curvilinearly to project axially into the casing member to engagement with said seat while supported on said partition webs, a core spaced within said sleeve and provided with a seat within the ring member, a second set of partition webs connecting the core with said sleeve, the space between the sleeve and core constituting a second port subdivided by the second set of partition webs, the partition webs of the second set having margins extending toward the seat of said core, a closure for the ring member having a tubular portion telescoped within the closure of the ring member, said tubular portion and said sleeve having complementary clamping shoulders, a second valve having a relatively heavy anchorage portion clamped between the shoulders of the sleeve and the tubular portions aforesaid, said second valve having an annular valve part extending from its anchorage portion on the edges of the second set of partition webs axially to a free edge engaged with the seat of said core, the space within the ring member between it and the sleeve constituting a manifold leading to the first port and said ring member having a pipe connection thereto, the space within the tubular portion of the cap and between it and the core constituting a chamber and the cap member having a pipe connection thereto.

9. In a device of the character described, the combination with an outer ring and inner core and an intermediate sleeve, the outer ring having an inlet connection and the intermediate sleeve having an outlet connection, of flexible annular valve elements having fixed connections connected respectively with the ring and sleeve and yieldable ends and respectively engaged with the sleeve and core, said elements extending from the inlet connection and toward the outlet connection respectively and axially in opposite directions from their respective points of connection, the sleeve and core being respectively provided with seats engaged by the respective elements, means providing communication between the inlet and outlet connections around the end of said sleeve subject to the control of said elements, the said elements constituting check valves arranged in series between the said inlet and outlet.

CHARLES F. WARREN.

REFERENCES CITED

The following references are of record in the file of this patent:

UNITED STATES PATENTS

| Number | Name | Date |
|---|---|---|
| 644,428 | Hubbe | Feb. 27, 1900 |
| 1,029,726 | Sprado | June 18, 1912 |
| 1,935,376 | Prellwitz | Nov. 14, 1933 |
| 2,033,354 | Pennington | Mar. 10, 1936 |
| 2,211,212 | Langdon | Aug. 13, 1940 |
| 2,270,737 | Langdon | Jan. 20, 1942 |
| 2,242,582 | Jeneick | May 20, 1941 |
| 2,395,906 | Owens | Mar. 5, 1946 |